United States Patent
Allen

(10) Patent No.: US 8,249,989 B2
(45) Date of Patent: Aug. 21, 2012

(54) CHECK CASHING AT AUTOMATED TELLER MACHINE

(75) Inventor: Morgan S. Allen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 289 days.

(21) Appl. No.: 12/700,017

(22) Filed: Feb. 4, 2010

(65) Prior Publication Data

US 2011/0191242 A1    Aug. 4, 2011

(51) Int. Cl.
*G06Q 40/00*    (2012.01)

(52) U.S. Cl. ............. 705/43; 705/35; 705/39; 705/42; 705/44; 705/45; 235/379; 902/8; 902/14

(58) Field of Classification Search .......... 705/35, 705/42, 43

See application file for complete search history.

(56) References Cited

U.S. PATENT DOCUMENTS

| 6,328,207 | B1 * | 12/2001 | Gregoire et al. ............. 235/379 |
| 6,536,663 | B1 | 3/2003 | Lozier et al. |
| 6,578,760 | B1 | 6/2003 | Otto |
| 6,856,965 | B1 | 2/2005 | Stinson et al. |
| 7,090,122 | B1 * | 8/2006 | Warren et al. ............. 235/379 |
| 2002/0128969 | A1 * | 9/2002 | Parmelee et al. ............. 705/42 |
| 2007/0278286 | A1 | 12/2007 | Crowell et al. |
| 2009/0145959 | A1 | 6/2009 | VanKirk et al. |

OTHER PUBLICATIONS

PCT/US2011/023291, International Search Report and Written Opinion, mailed Mar. 25, 2011.

* cited by examiner

*Primary Examiner* — Elizabeth Rosen
(74) *Attorney, Agent, or Firm* — Banner & Witcoff, Ltd.; Michael A. Springs

(57) ABSTRACT

A system and method of check cashing at an ATM are provided. In some examples, the system and method may include receiving a check at an ATM that does not include denominations of bills and/or coins to cash the check. The amount of the check may be rounded up to an amount for which appropriate denominations are available and the difference between the amount of the check and the rounded up amount may be charged to an account of a user, such as checking account, savings account, credit card, and the like.

17 Claims, 10 Drawing Sheets

CHECK CASHING AT AUTOMATED TELLER MACHINE

BACKGROUND

Today's banking industry is in a state of flux. As the economic conditions continue to fluctuate, the banking and financial services industries are striving to remain profitable. Accordingly, banks and other financial institutions are shifting transactions and other services to the least costly channels. For instance, conducting a transaction at a bank teller is more costly to the bank or financial institution than conducting the transaction at an Automated Teller Machine (ATM). Accordingly, banks are attempting to provide increased functionality and ease of use at ATMs to encourage customers and other users to conduct transactions at ATMs rather than through more traditional channels.

One transaction that is often conducted at a teller rather than via ATM is check cashing. Many conventional ATMs require a user to have sufficient funds in an account (e.g., funds at least equaling the amount of the check) in order to deposit the check and withdraw the amount of funds associated with the check. Additionally or alternatively, most ATMs do not store bills of every denomination and/or coin. Accordingly, many conventional ATMs are not capable of cashing checks for amounts that include change or dollar amounts for which the ATM does not store bills of appropriate denominations. Retrofitting ATMs to store bills of all denominations and/or coins may be extremely costly and inefficient. Accordingly, a system and method of providing check cashing capability without storing bills of all denominations and coins would be advantageous.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, a request to cash a check may be received at an ATM. The check may include an amount for which denominations of bills and/or coins are not available at the ATM. If appropriate denominations of bills and/or coins are not available at the ATM, the amount of the check may be increased or rounded up to an amount that can be dispensed by the ATM and a difference between the amount of the check and the increased dispensed amount may be charged to a user account, such as a checking or savings account, account associated with a debit card inserted into the ATM, account associated with a credit card inserted into the ATM, and the like. In some examples, authentication of a user may be required prior to increasing the amount of the check. Authentication may include providing user input including a personal identification number (PIN), Social Security Number, biometric data, and the like.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
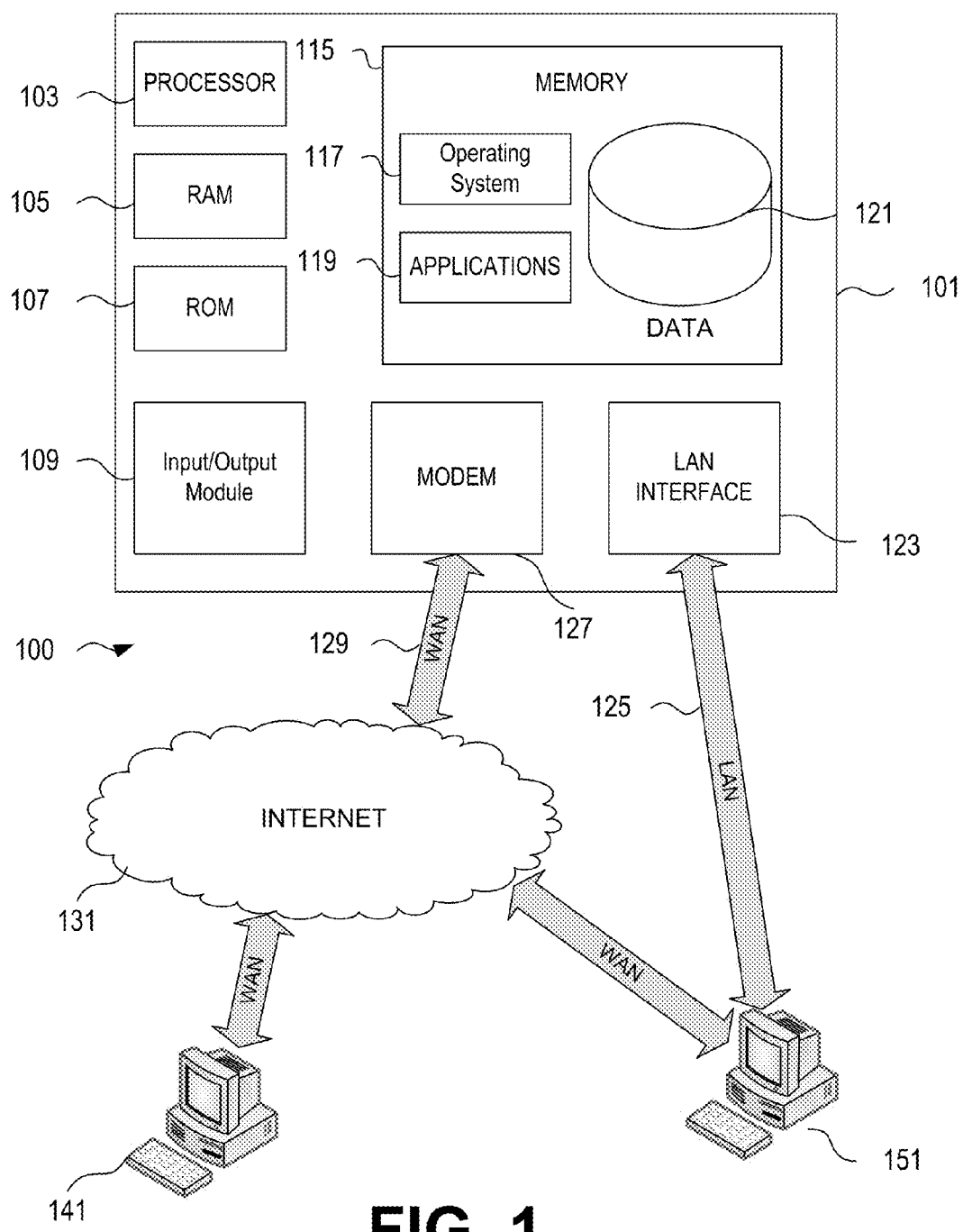
FIG. 1 illustrates an example of a suitable operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, etc.) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, etc. that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

Figure 2:
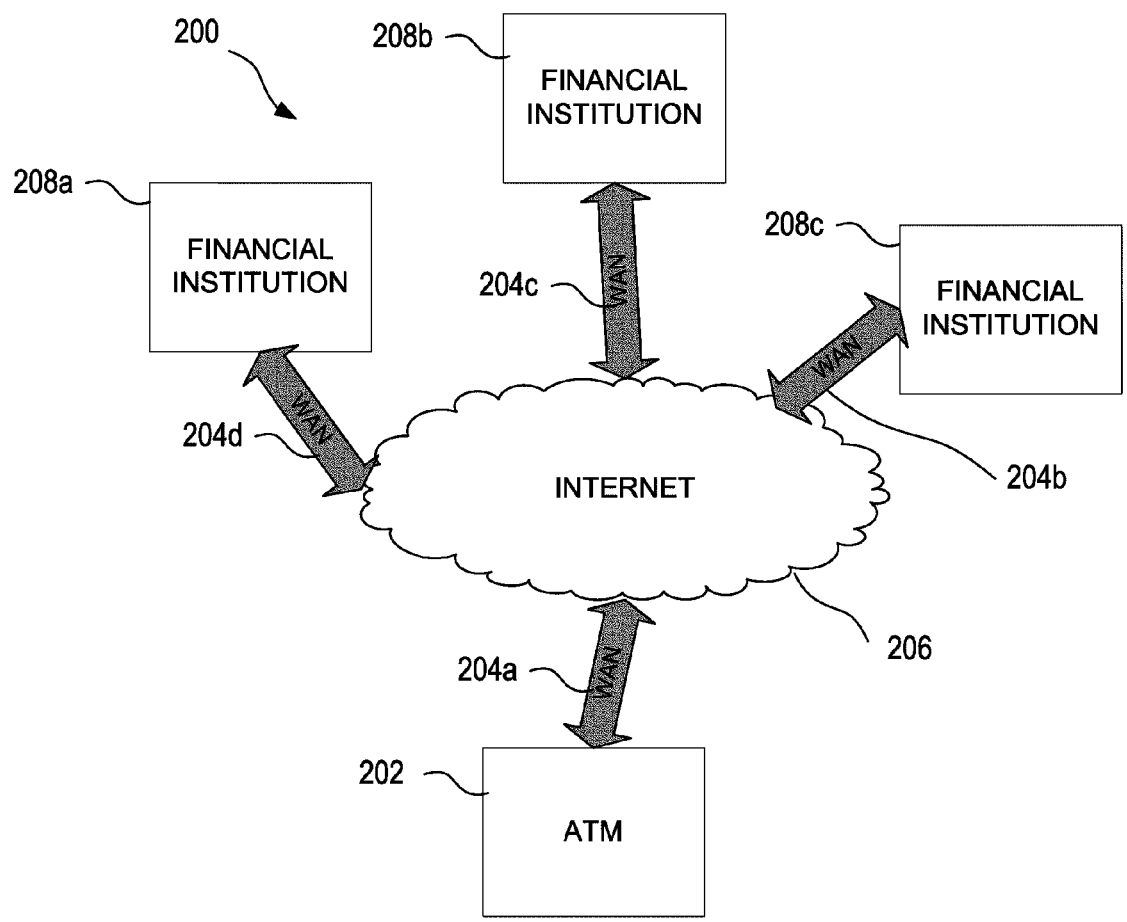
FIG. 2 illustrates an example ATM environment for cashing checks according to one or more aspects described herein.

The systems, devices, networks, etc. of FIG. 1 may, in one or more arrangements, be used to provide functionality to one or more cash handling devices, such as an automated teller machine (ATM). ATMs are commonly used to provide access to financial transactions without requiring an individual, such as a bank teller, to complete the transaction. ATMs are often associated with one or more financial institutions, however, typical ATMs are accessible to both customers of the associated financial institution and non-customers, sometimes for a charge. One example ATM environment 200 is shown in FIG. 2. The ATM 202 is connected, via WAN 204*a*-204*d* to a network 206, such as the Internet, to communicate with one or more financial institutions 208*a*-208*c*. Alternatively or additionally, the ATM 202 may be connected via one or more LAN connections. One of financial institutions 208*a*-208*c*, such as financial institution 208*a*, may be associated with the ATM 202 while the others, such as financial institutions 208*b*, 208*c* might not be associated with the ATM 202 but may communicate with the ATM 202 to complete transactions by customers associated with financial institutions 208*b*, 208*c* and conducted at the ATM 202.

One advantage to the use of ATMs is a reduction in costs associated with transactions. ATMs reduce and/or eliminate the need for a bank teller in some transactions. Accordingly, increasing the number, type, etc. of transactions that may be performed at an ATM would aid in reducing costs associated with a transaction. Further, the time associated with conducting a transaction at an ATM may be less than that associated with conducting the same transaction at a teller. This time savings may also include time to travel to the teller staffed banking center since ATMs often have more locations than traditional bank branches. Further still, the convenience of being able to conduct transactions at an ATM rather than having to travel to a teller staffed banking center is another advantage since it may result in increased business or may reduce business lost due to location of teller staffed banking centers.

Check cashing is one example transaction that may be conducted at an ATM. As discussed above, check cashing at conventional ATMs may require deposit of a check and withdrawal of funds already deposited within an account of the user. Additionally or alternatively, check cashing at ATMs might not be feasible since ATMs often do not provide bills of every denomination and/or change. The below described system and method of check cashing at ATMs may provide the ability to cash a check without requiring funds already on deposit and/or may round up the amount of funds associated with the check and requested by the user to an amount for which the ATM may provide cash in appropriate denominations.

Figure 3:
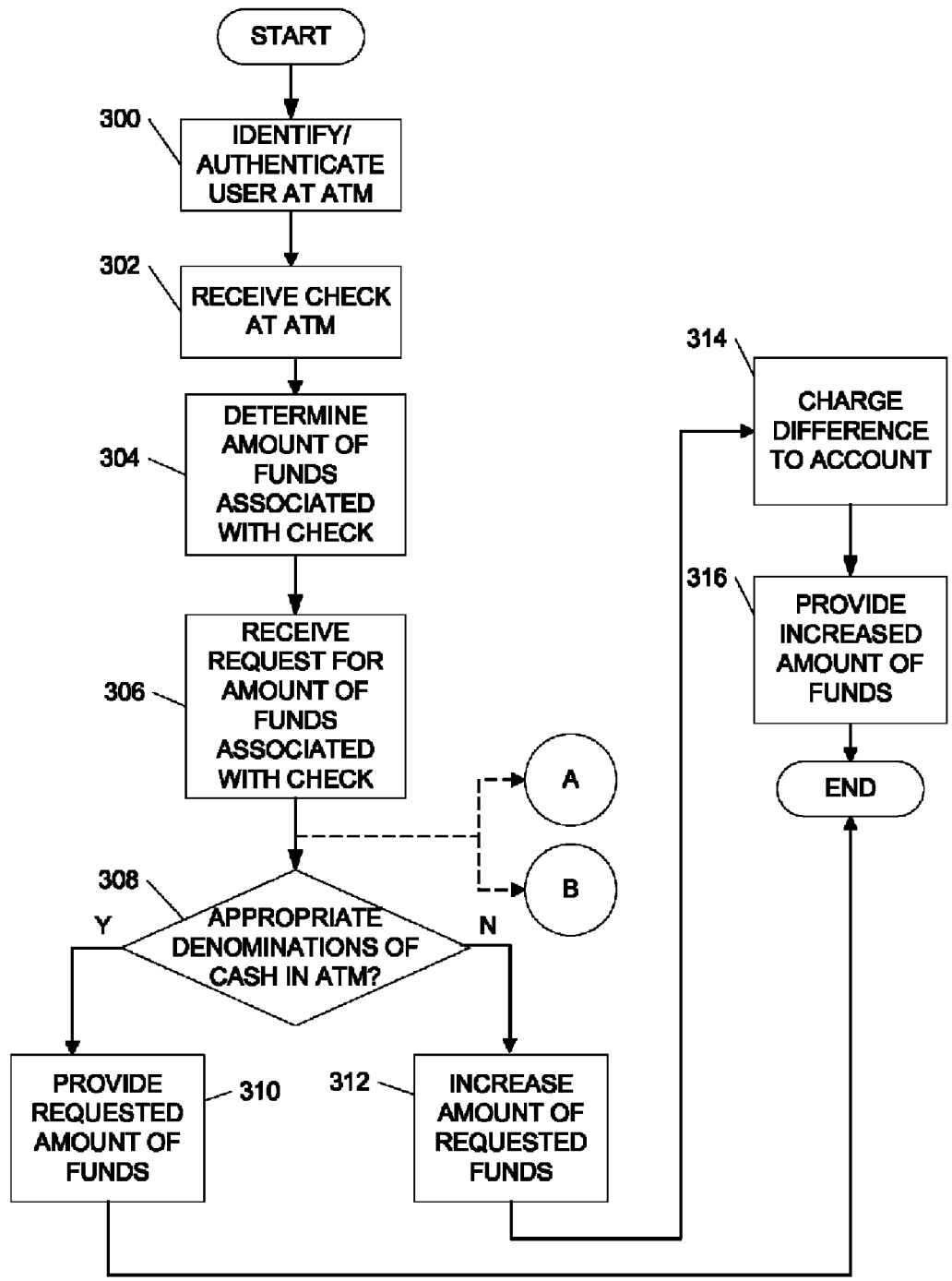
FIG. 3 illustrates one example method of check cashing at an ATM according to one or more aspects described herein.

FIG. 3 illustrates one method of check cashing according to aspects described herein. In step 300, a user at an ATM is identified and/or authenticated. For instance, a user may initiate a transaction at the ATM by inserting an ATM card and, in some arrangements, providing a personal identification number (PIN) to confirm that they are the user associated with the ATM card and/or the associated account. In step 302, a check is received at a cash handling device, such as an ATM. In step 304, the amount of funds associated with the check is determined. This may be done using known methods of identification such as scanning and optical character recognition, and the like. In step 306, a request for the amount of funds identified on the check is made. In some examples, a user may select a "cash check" option and may insert the check into the ATM. Selection of the cash check option may constitute request for the amount of funds identified on the check. In other examples, the user may insert the check and then make a selection to cash it or withdraw the amount of funds identified on the check.

In step 308 a determination is made as to whether the ATM stores/provides cash in appropriate denominations to provide the exact amount of requested funds. For instance, many ATMs store cash in only a few denominations, such as $20 bills and $50 bills. Additionally or alternatively, many ATMs do not store coins. Accordingly, if a user requests to cash a check in the amount of, for instance, $48.75, a conventional ATM would be unable to fulfill this request because it may not store/provide change in the amount of $0.75 (or any amount of change) and/or it may not include bills in $1 denominations in order to provide $48. Accordingly, in accordance with aspects described herein, if, in step 308 it is determined that the ATM does store funds in appropriate denominations to provide the requested amount of funds, the exact amount of requested funds may be provided in step 310. Alternatively, if, in step 308, appropriate denominations are not available, the amount of funds requested may be increased to an amount for which appropriate denominations of funds are available, as shown in step 312. For instance, using the example of a request to cash a check for $48.75, if the ATM stores $50 bills, the amount of funds requested may be rounded up to $50 to permit the ATM to fulfill the request. Alternatively, if the ATM stores only $20 bills, the request may be rounded up to $60 to permit the ATM to fulfill the request. In some examples, the amount requested may be rounded up to the nearest amount for which bills of appropriate denominations are available.

In step 314, the difference between the amount of the check as requested and the rounded up amount is charged (e.g., debited) to an account associated with the user. For instance, the difference may be charged to a checking, savings, etc. account of the user, a debit card may be inserted and the difference debited from an account associated with the card, a credit card may be inserted and the difference may be charged to the credit card, etc. In some examples, a determination may be made that there are sufficient funds in the account to be charged prior to charging the difference to the account. Various options for charging the difference to the user will be discussed more fully below. In step 316 the increased amount of funds may be provided to the user.

Figure 4:
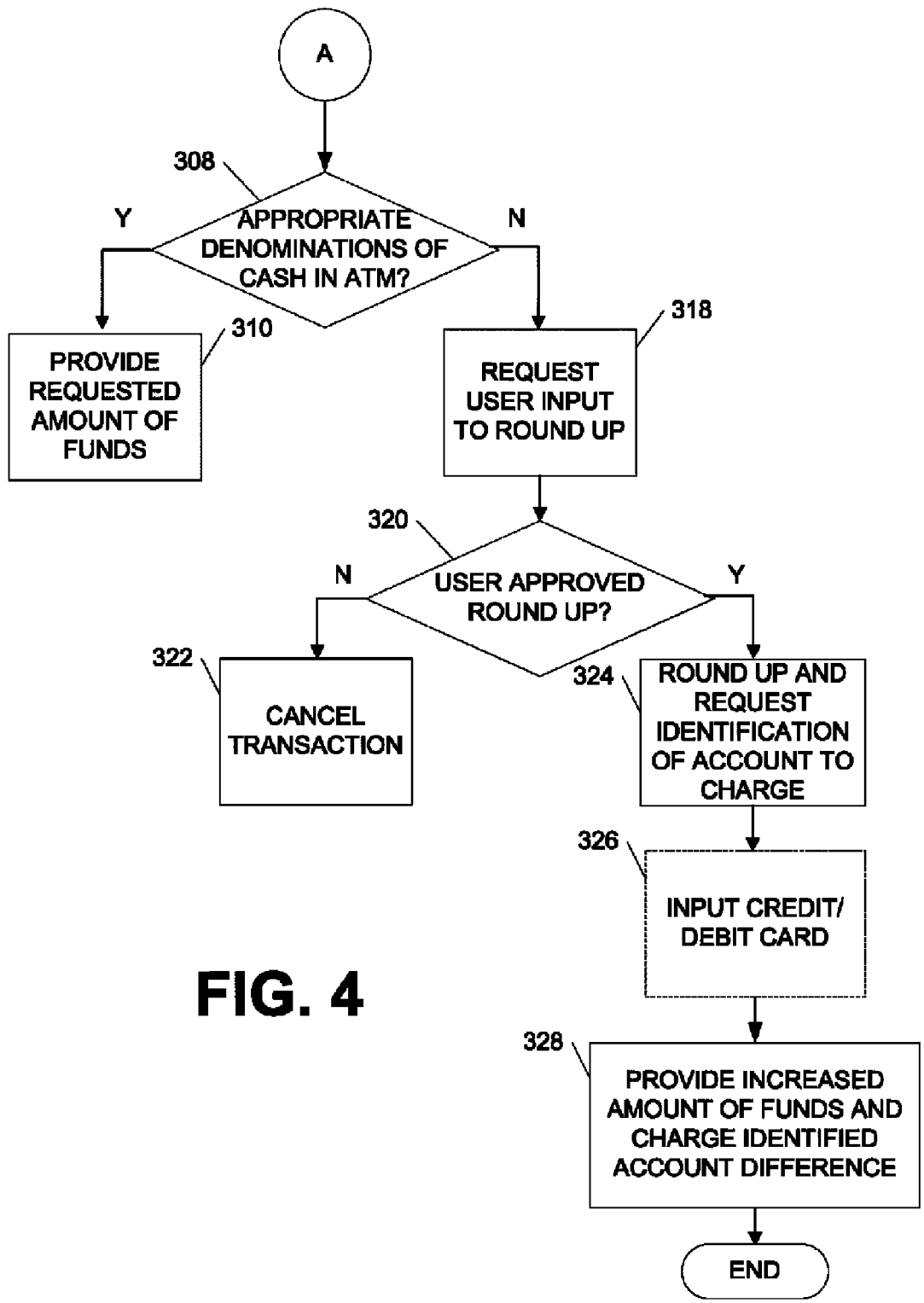
FIG. 4 illustrates another example method of check cashing at an ATM according to one or more aspects described herein.

FIG. 4 illustrates alternate or additional features of the system and method of cashing a check at an ATM described herein. Similar to the method described in FIG. 3, in step 308 a determination is made as to whether the ATM includes/provides cash of appropriate denominations to provide the requested funds. If the ATM does include appropriate denominations, the check will be cashed and the requested funds may be provided to the user in step 310. If the ATM does not include appropriate denominations, the ATM may request user input in step 318 regarding whether to round up the amount requested to an amount for which the ATM has appropriate denominations of bills. In step 320, a determination is made as to whether the round up of the amount is approved by the user. If not, the transaction may be cancelled in step 322. If the user approves rounding up the amount of funds requested in step 320, the ATM may round up the amount of funds requested and may request user input identifying an account of the user to which the difference between the amount of the check and the rounded up amount should be charged, as shown in step 324. Identification of an account may include inputting an account number associated with the user, identifying an account from a list of available accounts, etc. In some examples, if the user is a customer of the financial institution associated with the ATM, the ATM may provide a list of accounts associated with the user which can be debited the difference. In some examples, the method may include a step of determining whether the user is a customer of the financial institution associated with the ATM.

In optional step 326, a user may insert a debit or credit card into the ATM to which the difference may be debited or charged, as appropriate. For instance, upon requesting identification of an account in step 324, a user may insert a debit or credit card and the ATM may automatically charge the difference to the debit/credit card. In step 328, the increased amount of funds may be provided to the user and the difference may be charged to the identified account.

Figure 5:
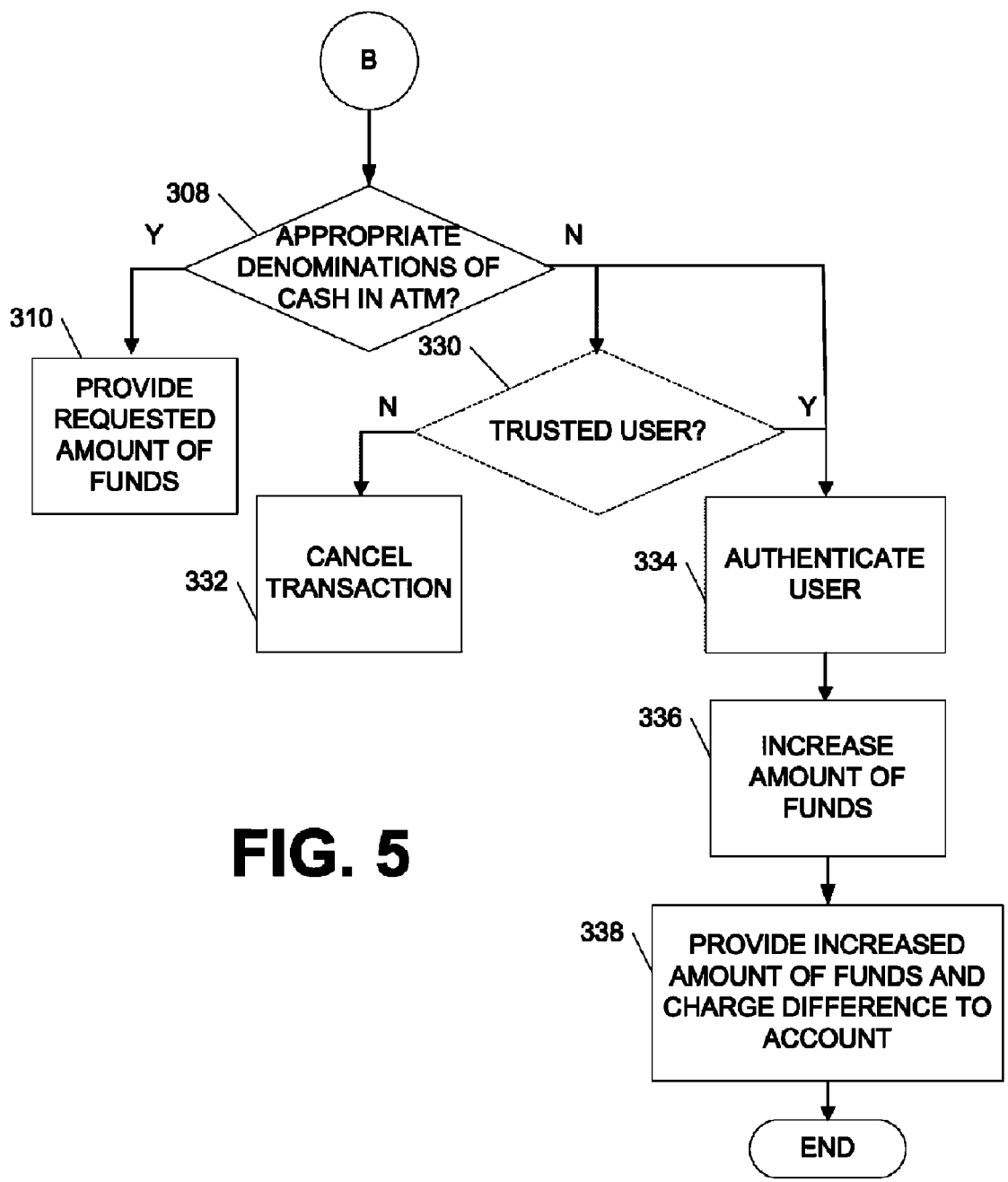
FIG. 5 illustrates yet another example method of check cashing at an ATM according to one or more aspects described herein.

FIG. 5 illustrates alternative or additional features of cashing a check at an ATM in accordance with aspects described herein. Similar to the methods illustrated in FIGS. 3 and 4, in step 308 a determination is made as to whether appropriate denominations of bills are available to provide the requested funds. If the bills are available, the requested funds may be provided in step 310. If appropriate denominations of bills are not available, the user may be authenticated in step 334. Authentication of the user may include requesting user input such as a personal identification number, Social Security Number or portion thereof, biometric data such as fingerprint, voice print, retinal scan, etc., and the like. The user input may be matched against information previously obtained for the user and, if valid, the transaction may proceed. Alternatively or additionally, authentication of the user may include requesting a debit, credit, or other card be inserted into the ATM as an additional form of identification and/or to provide a funding source for the difference between the amount of the check and the rounded up amount being provided to the user. In some examples, additional forms of identification may be used during the authentication process, such as a driver's license or other physical identification media. These additional forms of identification may be inserted into the ATM or, in some examples, may be scanned (such as a barcode scanner) or may include a radio frequency identifier that may be scanned to confirm the identity. In some examples, the ATM may confirm that the owner or named user on the debit, credit, etc. card, license, etc. inserted (or scanned) matches the owner or named person on the ATM card that was used to initiate the transaction.

Once the user is authenticated, the amount of funds is increased in step 336 to an amount that can be provided by the ATM. In step 338, the increased amount of funds is provided to the user and the difference is charged to an account of the user.

Optionally, in step 330, a determination may be made as to whether the user is a trusted user. For instance, if the user is a customer of the financial institution associated with the ATM (e.g., has one or more accounts, loans, etc. at the financial institution) the user may be considered a trusted user. Additionally or alternatively, if the user has a long standing relationship with the financial institution, etc., the user may be considered a trusted user. If the user is not determined to be a trusted user in step 330, the transaction may be cancelled in step 332. Alternatively, if the user is a trusted user, the user may be authenticated in step 334 and the amount of funds may be increased and provided to the user as discussed above with respect to step 338.

In some examples, an additional charge may be applied if a user cashes an invalid check using the above-described system and method. For instance, if a user cashes a check for which the required funds are not available, the amount of the check and/or any additional charge may be charged to an account of the user (e.g., checking, savings, etc.) or to a credit card (such as the credit card inserted to receive the charge of the difference between the amount of the check and the rounded up amount provided to the user). For example, the additional charge may be a flat charge or may be a percentage of the amount of the cashed check. In some arrangements, a user may have to authorize, approve or accept this potential additional charge prior to receiving the rounded up funds as described herein.

Aspects of the methods described above may be used in conjunction with various other aspects described herein without departing from the invention. For instance, in some examples, every transaction may require authentication of the user.

Figure 6:
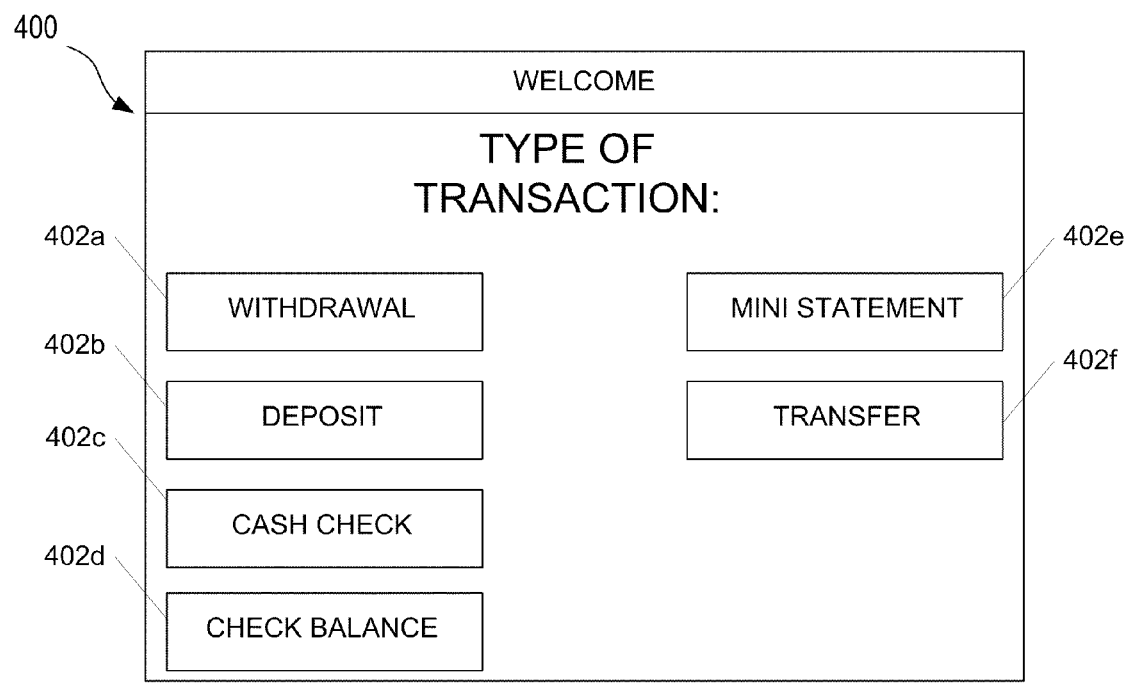
FIG. 6 illustrates one example user interface illustrating options for selection of a transaction at an ATM according to one or more aspects described herein.

FIG. 6 illustrates one example user interface 400 for cashing a check according to aspects described herein. The user interface 400 provides various transaction options 402*a*-402*f* for a user to select. The arrangement shown may be a touch sensitive display and/or may include soft keys configured for selection of various options. In one example, a user may select cash check option 402*d* in order to cash a check according to aspects described herein.

Figure 7:
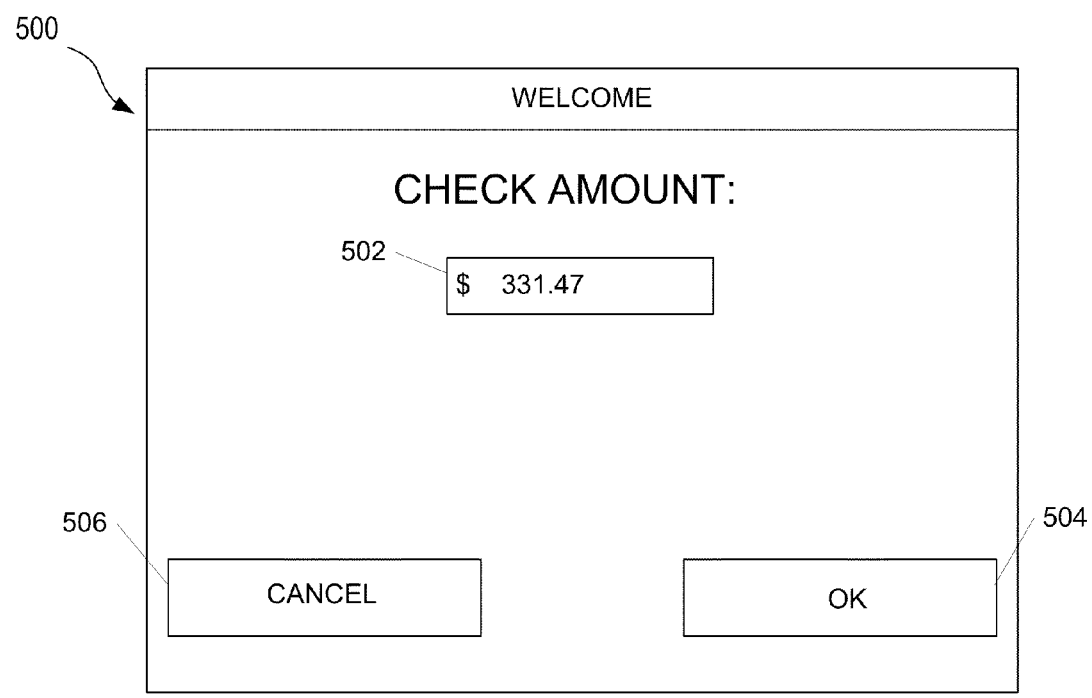
FIG. 7 illustrates one example user interface illustrating providing user input indicating an amount of a check to be cashed according to one or more aspects described herein.

Upon selection of the cash check option (e.g., 402*c* of FIG. 6), a user interface, such as user interface 500 in FIG. 7, may be provided in which a user may indicate an amount of the check being cashed. For instance, a user may input the amount in field 502 using an alphanumeric keypad or other input device provided at the ATM. Once the amount is indicated, the user may select an ok option 504 to continue with the transaction or may choose to cancel the transaction using cancel option 506.

Figure 8:
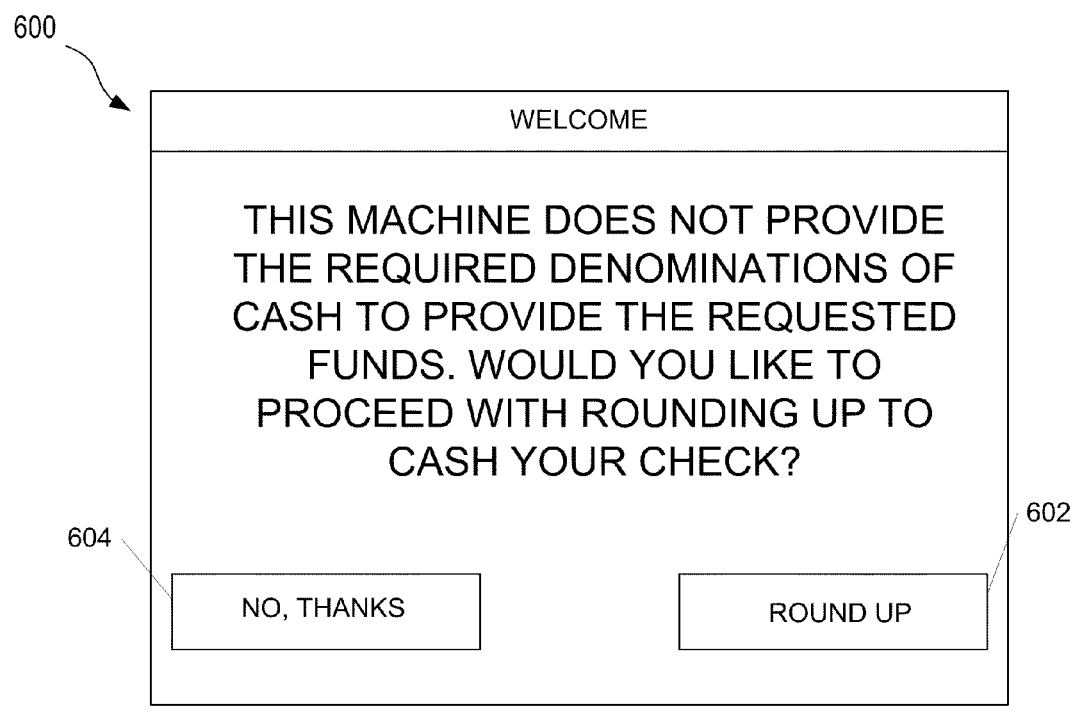
FIG. 8 illustrates one example user interface illustrating user options for increasing a requested amount of funds to provide check cashing according to one or more aspects described herein.

The ATM may evaluate whether the appropriate or necessary denominations of bills/change are available to provide the requested amount of the check. If the appropriate denominations are not available, the ATM may provide the user with an indication that the amount of the check can not be provided, such as shown in user interface 600 in FIG. 8. Upon receiving the indication that the appropriate denominations of bills/change are not available, the user may elect to round up the amount requested to an amount for which denominations of bills are available by selecting round up option 602. Alternatively, the user may elect to cancel the transaction, such as by selecting no, thanks option 604.

Figure 9:
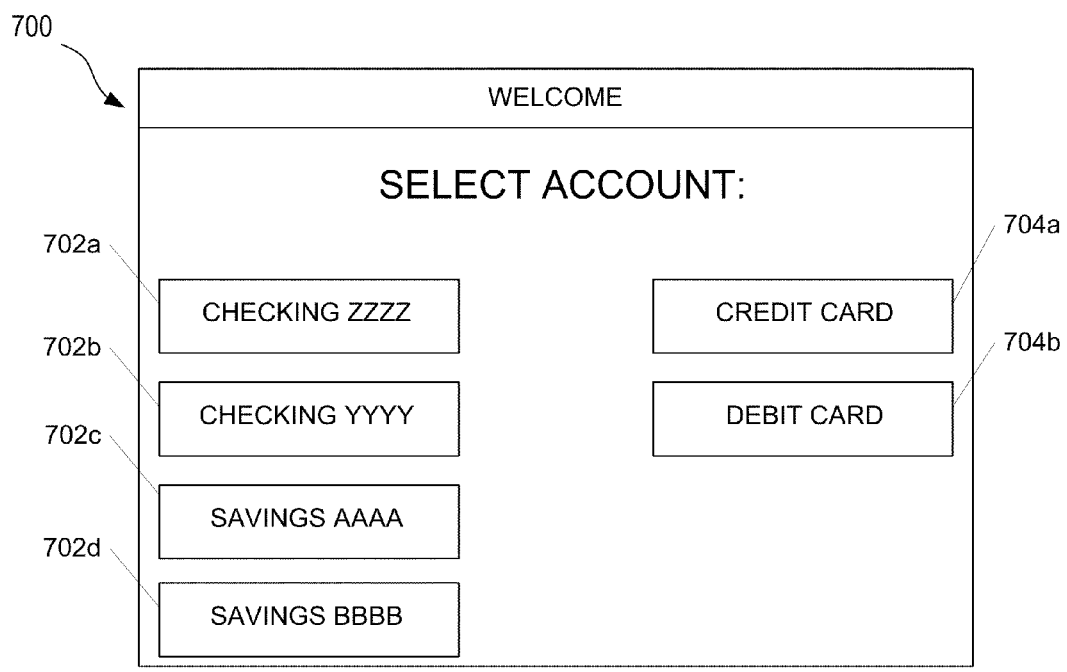
FIG. 9 illustrates one example user interface illustrating options for selection of an account to which the difference between an amount of the check being cashed and an increased amount that may be provided should be charged according to one or more aspects described herein.

Once a user has selected to round up the amount being received, in some arrangements, the user may select an account from which the difference between the amount of the check and the rounded up amount being received should be debited. FIG. 9 illustrates one example user interface 700 in which a user may select an account, such as accounts 702a-702d. Additionally or alternatively, the user may choose to insert a debit or credit card by selecting one of options 704a and 704b, respectively, and having the difference debited or charged to the account associated with the card.

Figure 10:
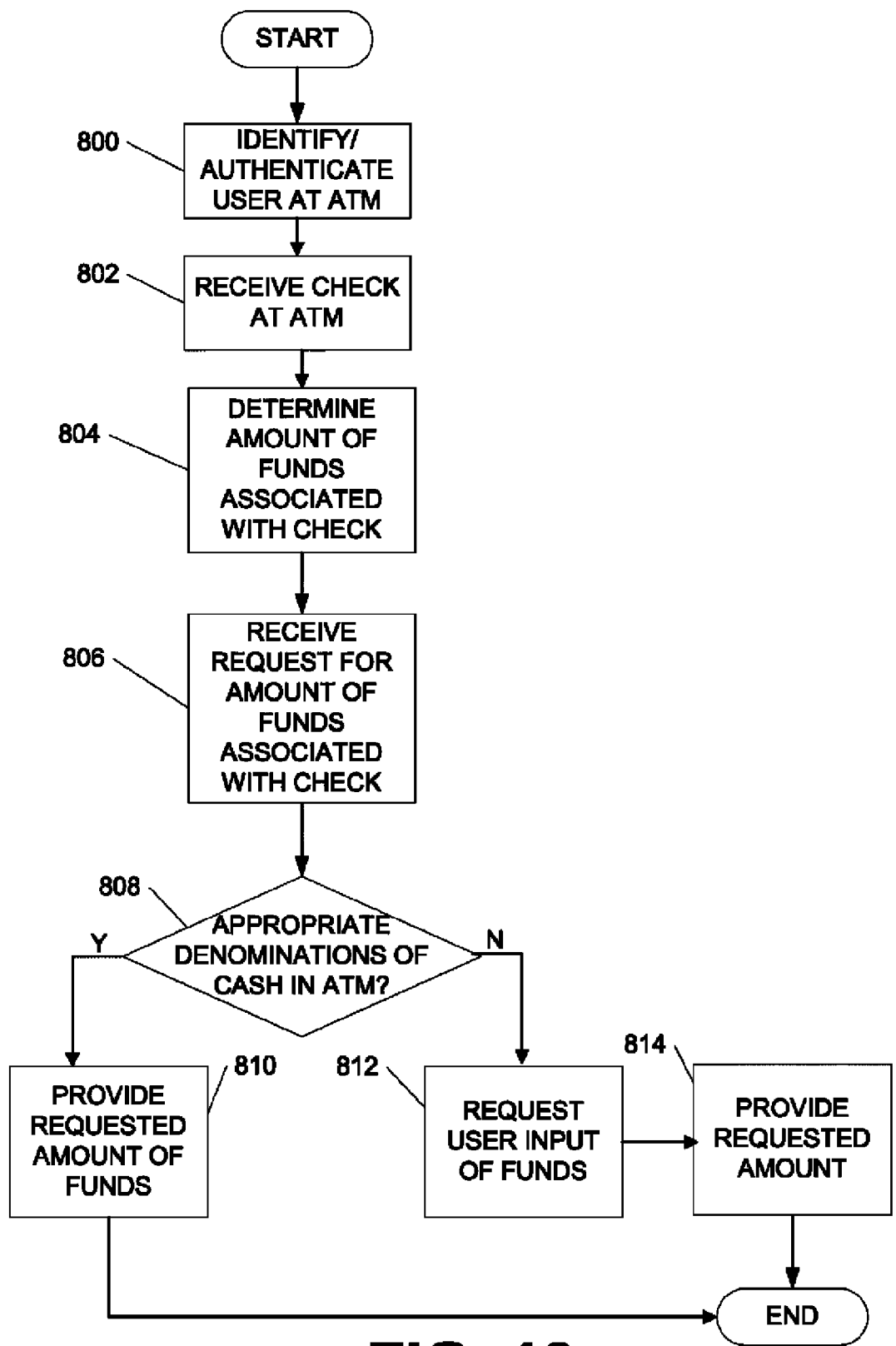
FIG. 10 illustrates yet another example method of check cashing at an ATM according to one or more aspects described herein.

FIG. 10 illustrates another example method of check cashing at an ATM. In step 800, a user at an ATM is identified and/or authenticated. For instance, a user may initiate a transaction at the ATM by inserting an ATM card and, in some arrangements, providing a PIN to confirm that they are the user associated with the ATM card and/or the associated account. In step 802, a check is received at the ATM. In step 804 the amount of funds associated with the check is determined. In step 806 a request for the amount of funds associated with the check is received. In step 808 a determination is made as to whether the ATM has appropriate denominations of cash to provide the requested funds. If it does, the requested funds are provided in step 810. If the appropriate denominations are not available, a request may be made to a user to insert an amount of funds that would then equal an amount for which the ATM had available denominations in step 812. For instance, if a user requests to cash a check for $15 at an ATM at which the smallest denomination of bill available is $20, the user may be requested to input $5 and then the ATM will dispense $20 to the user in step 814. Thus, the ATM will provide the $15 requested plus the $5 input by the user in the form of a $20 bill.

In some examples, an ATM may be configured to accept coin in order to round up the requested amount to an amount for which denominations are available. For instance, if the check being cashed is for $19.75, a user may insert $0.25 (e.g., one quarter, two dimes and a nickel, etc.) and the ATM may then dispense $20 (such as in the form of a $20 bill).

In some alternate examples, a user may also elect to round down the amount of the check being cashed and have the difference deposited into one or more accounts of the user. For instance, a user may insert an ATM card and select an option to cash a check. The requested amount of the check may be an amount for which the ATM does not have appropriate denominations of funds to dispense. Accordingly, a user may elect to round down the requested amount and have the difference between the amount of the check and the amount received deposited into, for instance, an account associated with the ATM card inserted, such as a checking, savings, money market, etc. account.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. An apparatus comprising:
   a processor; and
   memory storing computer readable instructions that, when executed by the processor, cause the apparatus to:
   receive a check indicating an amount of funds by an automated teller machine (ATM) associated with a financial institution;
   receive a request from a user for the amount of funds;
   determine at the ATM that the ATM does not have one or more denominations of cash to provide an exact match of the requested amount of funds;
   responsive to determining that the ATM does not have the one or more denominations, request user input approving increasing the requested amount of funds to an amount for which the ATM is able to provide an exact match;
   responsive to receiving user input approving increasing the requested amount of funds to the amount for which the ATM is able to provide an exact match, increase the amount of funds to the amount for which the ATM is able to provide an exact match;
   request user input identifying an account from which to debit a difference between the requested amount of funds and the increased amount of funds;
   determine that the account has a balance greater than the increased amount of funds; and
   responsive to determining that the account at the financial institution has a balance greater than the increased amount of funds, provide the increased amount of cash and charging a difference between the requested amount and the provided increased amount to the account.

2. The apparatus of claim 1, wherein charging the difference between the requested amount and the provided increased amount to the account of the user includes charging the difference to a credit card of the user.

3. The apparatus of claim 1, wherein the computer readable instructions, when executed, request insertion of at least one of a debit card and credit card to which the difference is charged.

4. The apparatus of claim 1, wherein the computer readable instructions, when executed, request authentication information from the user.

5. The apparatus of claim 1, wherein increasing the amount of funds includes:

requesting user input identifying a rounded up amount of funds higher than a denominations of cash are available; and responsive to receiving user input identifying the rounded up amount of funds, increasing the requested amount of funds to the rounded up amount of funds.

6. The apparatus of claim 1, wherein the computer readable instructions, when executed, determine whether the balance of the identified account is greater than the increased amount of funds plus any additional charge for using the ATM.

7. The apparatus of claim 1, wherein authenticating the user includes requesting user input including at least one of a personal identification number, Social Security Number, and biometric data.

8. An apparatus, comprising:
a processor; and
memory storing computer readable instructions that, when executed by the processor, cause the apparatus to:
receive a check indicating an amount of funds by an ATM associated with a financial institution;
receive a request for the indicated amount of funds from a user;
determine, at the ATM, that the ATM does not include one or more denominations of cash to provide an exact match of the requested amount;
responsive to determining that the ATM does not include the one or more denominations, request user input approving increasing the requested amount of funds to an amount for which the ATM is able to provide an exact match;
responsive to receiving user input approving increasing the requested amount of funds to the amount for which the ATM is able to provide an exact match, increase the amount of funds to the amount for which the ATM is able to provide an exact match;
determine that the user is a trusted user;
responsive to determining that the user is a trusted user, request user input identifying an account from which to debit a difference between the requested amount of funds and the increased amount of funds; and
provide the increased amount of funds and debit the identified user account a difference between the requested indicated amount of funds and the increased amount of funds.

9. The apparatus of claim 8, wherein debiting the identified user account includes debiting an account associated with a debit card inserted into the ATM.

10. The apparatus of claim 8, wherein the identified account is an account at the financial institution.

11. The apparatus of claim 10, wherein determining that the user is a trusted user includes requesting user input including at least one of a personal identification number, Social Security Number, and biometric data.

12. One or more non-transitory computer readable media storing computer readable instructions that, when executed, cause an apparatus to:
receive a check indicating an amount of funds by an ATM associated with a financial institution;
receive a request for the indicated amount of funds from a user;
determine, at the ATM, that the ATM does not include one or more denominations of cash to provide an exact match of the requested amount;
responsive to determining that the ATM does not include the one or more denominations, request user input approving increasing the requested amount of funds to an amount for which the ATM is able to provide an exact match;
responsive to receiving user input approving increasing the requested amount of funds to the amount for which the ATM is able to provide an exact match, increase the amount of funds to the amount for which the ATM is able to provide an exact match;
request user input identifying an account at a financial institution from which to debit a difference between the requested amount of funds and the increased amount of funds;
determine that the account has a balance greater than the increased amount of funds; and
responsive to determining that the account at the financial institution has a balance greater than the increased amount of funds, provide the increased amount of funds and debit the account a difference between the requested indicated amount of funds on the check and the increased amount of funds.

13. The one or more non-transitory computer readable media of claim 12, wherein the computer-readable instructions, when executed, further cause the apparatus to authenticate the user.

14. The one or more non-transitory computer readable media of claim 13, wherein authenticating the user includes requesting user input including at least one of a personal identification number, Social Security Number, and biometric data.

15. The one or more non-transitory computer readable media of claim 12, wherein the computer readable instructions, when executed, determine whether the balance of the identified account is greater than the increased amount of funds plus any additional charge for using the ATM.

16. The one or more non-transitory computer readable media of claim 12, wherein increasing the amount of funds includes:
requesting user input identifying a rounded up amount of funds higher than a first highest amount for which denominations of cash are available; and
responsive to receiving user input identifying the rounded up amount of funds, increasing the requested amount of funds to that amount.

17. The one or more non-transitory computer readable media of claim 12, wherein charging the difference between the requested amount and the provided increased amount to the account includes charging the difference to a credit card of the user.

* * * * *